US008079270B2

(12) United States Patent
Gratz et al.

(10) Patent No.: US 8,079,270 B2
(45) Date of Patent: Dec. 20, 2011

(54) METHOD AND A DEVICE FOR MEASURING A FORCE AND A POSITION

(75) Inventors: Petr Gratz, Kurim (CZ); Milos Hanus, Kosice (SK); Pavel Pangrac, Senohraby (CZ); Dieter Bayer, Boblingen (DE); Volker Ebert, Leinfelden (DE)

(73) Assignee: Honeywell Technologies SARL, Morges (CH)

( * ) Notice: Subject to any disclaimer, the term of this patent is extended or adjusted under 35 U.S.C. 154(b) by 1447 days.

(21) Appl. No.: 11/467,526

(22) Filed: Aug. 25, 2006

(65) Prior Publication Data

US 2007/0044567 A1 Mar. 1, 2007

(30) Foreign Application Priority Data

Aug. 26, 2005 (DE) .................. 10 2005 040 536

(51) Int. Cl.
*G01B 7/16* (2006.01)
(52) U.S. Cl. ........................................ 73/781
(58) Field of Classification Search .......... 251/129.04; 73/514.16, 781
See application file for complete search history.

(56) References Cited

U.S. PATENT DOCUMENTS

| 3,731,184 A | * | 5/1973 | Goldberg et al. | ............. 324/239 |
| 4,121,049 A | | 10/1978 | Roeber | |
| 4,578,604 A | * | 3/1986 | Eilertsen | ........................ 310/30 |
| 5,046,702 A | * | 9/1991 | Miyazawa et al. | ........ 251/129.04 |
| 5,161,083 A | * | 11/1992 | Mohler et al. | ................. 361/143 |
| 5,301,895 A | * | 4/1994 | Sheehan et al. | ........... 242/150 M |
| 5,467,244 A | * | 11/1995 | Jayawant et al. | ............. 361/144 |
| 6,565,064 B2 | * | 5/2003 | Smith et al. | ............... 251/129.04 |
| 2001/0043450 A1 | * | 11/2001 | Seale et al. | ...................... 361/160 |
| 2003/0059219 A1 | * | 3/2003 | Takahashi et al. | ............. 396/449 |
| 2003/0114748 A1 | * | 6/2003 | Su et al. | ......................... 600/422 |
| 2003/0121261 A1 | * | 7/2003 | Geiger | ............................ 60/533 |
| 2004/0055318 A1 | * | 3/2004 | Hirota | .............................. 62/222 |
| 2004/0083993 A1 | * | 5/2004 | Seale et al. | .................. 123/90.11 |
| 2004/0122536 A1 | * | 6/2004 | Saitou | .............................. 700/70 |
| 2004/0177612 A1 | * | 9/2004 | Geiger | ............................ 60/545 |
| 2004/0244209 A1 | * | 12/2004 | Uehira et al. | .................. 33/1 PT |
| 2005/0001556 A1 | * | 1/2005 | Hoffman et al. | .......... 315/111.91 |

(Continued)

FOREIGN PATENT DOCUMENTS
GB 2289947 12/1995

*Primary Examiner* — Quan-Zhen Wang
*Assistant Examiner* — Tony Davis
(74) *Attorney, Agent, or Firm* — Seager, Tufte & Wickhem LLC

(57) ABSTRACT

A method and apparatus for measuring a force and a position at a linear actuating mechanism (20). In one illustrative embodiment, a change in an electrical characteristic of a first coil system (1, 3a, 6) for measuring a position of the linear actuating mechanism, wherein the change in the electrical characteristic is caused by moving of a first measurement member (6) in the first coil system (1, 3a, 6), and a change in an electrical characteristic of a second coil system (2, 3b, 5) for measuring a force acting at the linear actuating mechanism (20), wherein the change in the electrical characteristic is caused by moving of a second measurement member (5) in the second coil system (2, 3b, 5), are detected. The movement of the first measurement member (6) is generated by a positional change of a linear shaft member of the linear actuating mechanism (20), and the movement of the second measurement member (5) is generated by a force-displacement conversion via a deformation member.

21 Claims, 3 Drawing Sheets

U.S. PATENT DOCUMENTS

Figure 1:
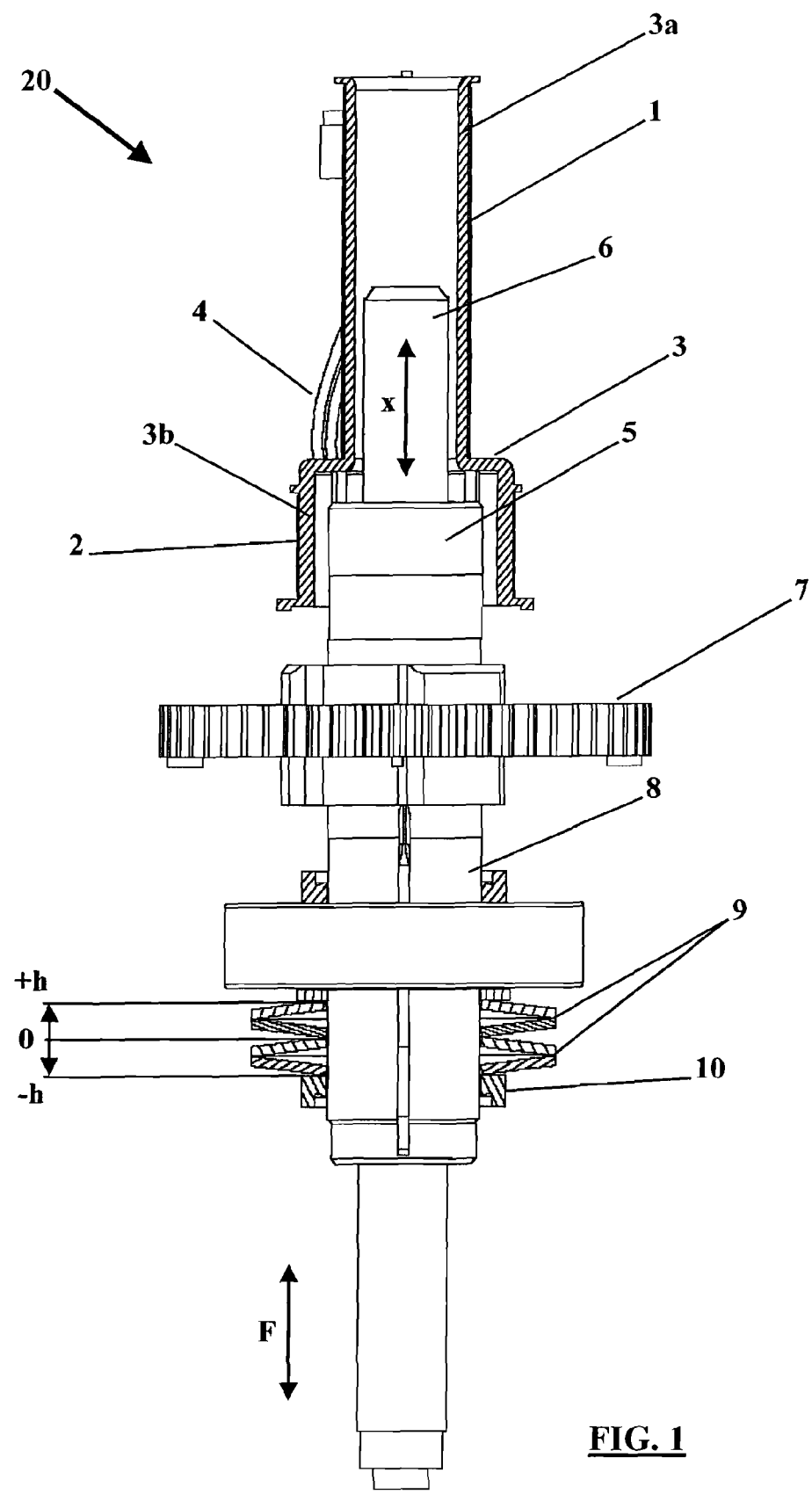

| | | | |
|---|---|---|---|
| 2005/0077855 A1* | 4/2005 | Hochhalter et al. | 318/567 |
| 2005/0242815 A1* | 11/2005 | Morris et al. | 324/319 |
| 2006/0059989 A1* | 3/2006 | Wang et al. | 73/514.16 |
| 2006/0066269 A1* | 3/2006 | Lumley et al. | 318/135 |
| 2006/0171091 A1* | 8/2006 | Seale et al. | 361/160 |
| 2006/0175190 A1* | 8/2006 | Schuetze et al. | 204/192.38 |
| 2006/0202682 A1* | 9/2006 | Mednikov et al. | 324/207.16 |
| 2006/0254651 A1* | 11/2006 | Hodge et al. | 137/487.5 |
| 2007/0145316 A1* | 6/2007 | Morikawa | 251/129.05 |
| 2007/0241298 A1* | 10/2007 | Herbert et al. | 251/129.04 |
| 2008/0017255 A1* | 1/2008 | Petersen | 137/522 |
| 2011/0061559 A1* | 3/2011 | Lund | 104/119 |

* cited by examiner

METHOD AND A DEVICE FOR MEASURING A FORCE AND A POSITION

This application claims priority to DE102005040536.3, filed on Aug. 26, 2005.

FIELD

The present invention generally relates to a method for measuring a force and a position at a linear actuating mechanism, a device for measuring a force and a position at a linear actuating mechanism as well as a linear actuating mechanism comprising a respective device for measuring a force and a position.

BACKGROUND

Linear actuating mechanisms, also sometimes designated as linear drive or linear actuators, are available in a plurality of sizes and performance classes and are used for plural applications. One example of such an application is the use of a linear actuating mechanism as a drive member in a heating control system or air-conditioning system, e.g. as linear drive for one valve or plural valves for control by thermostats.

For the use of linear actuating mechanisms, it can often be desirable to know certain operational parameters, such as the position of a shaft member of the linear actuating mechanism, e.g. of a leading screw or a push rod, or the force with which the linear actuating mechanism acts on the element to be operated (e.g. a valve). In rather complex control systems, in particular, such as an electronically controlled heating system or air-conditioning system of a building or the like, in which the linear actuating mechanism acts as a controlling element or the like, a respective acquisition of operational parameters is important for a precise control of the adjustments of the valves, or for correcting the same.

So far, in the case of linear actuating mechanisms used in this way, the detection of the force applied is often effected by means of a micro-switch provided at the linear actuating mechanism. The micro-switch is typically arranged such that it is switched when a predetermined position of the shaft member or push rod, which has been determined as a reference position for the application of a limit force, is reached. Thereby, the operation of the linear actuating mechanism is switched off.

This arrangement can be, however, comparatively inaccurate and error-prone. For instance, a calibration can be difficult or impossible, since the position of the micro-switch is usually fixed during manufacture. Optionally, calibration is often effected by a manual adjustment of a pertinently mounted screw/bolt, which, however, involves laborious manual work. Additionally, it is often not possible with such a construction to adjust forces independently. Also, the system is often susceptible to environmental influences, such as a temperature influence that may lead to an expansion or contraction of the material. Thus, systematic errors may affect the detection of the limit force. Furthermore, the micro-switch is switched mechanically, so that pollutions or the like can lead to disturbances. This can lead to damage of the valves or to an insufficient actuation of the valves by the linear actuating mechanism.

SUMMARY

Generally, the present invention provides an improved method and apparatus for detecting operational parameters, particularly a force and a position, at a linear actuating mechanism.

An illustrative method for measuring a force and a position at a linear actuating mechanism may include detecting a change in an electrical characteristic of a first coil system for measuring a position of the linear actuating mechanism, wherein the change in the electrical characteristic is caused by moving of a first measurement member or body in the first coil system, detecting a change in an electrical characteristic of a second coil system for measuring a force acting at the linear actuating mechanism, wherein the change in the electrical characteristic is caused by moving of a second measurement member or body in the second coil system, wherein the moving of the first measurement member is generated by a positional change of a linear shaft member of the linear actuating mechanism, and the moving of the second measurement member is generated by a force-displacement conversion via a deformation member.

In an illustrative device, there is provided a device for measuring a force and a position at a linear actuating mechanism, comprising: a linear shaft member, a first coil system having a first movable measurement member, a second coil system having a second movable measurement member, a deformation member connected to the second measurement member, and a detecting means for detecting a change in an electrical characteristic of the first coil system for measuring a position of the linear actuating mechanism and in an electrical characteristic of the second coil system for measuring a force acting at the linear actuating mechanism, wherein the change in the electrical characteristic of the first coil system is caused by a moving of the first measurement member in the first coil system and the change in the electrical characteristic of the second coil system is caused by a moving of the second measurement member in the second coil system, wherein the movement of the first measurement member is generated by a positional change of the linear shaft member of the linear actuating mechanism and the movement of the second measurement member is generated by a force-displacement conversion via the deformation member.

In another illustrative embodiment, there is provided a linear actuating mechanism comprising: a linear shaft member adapted to carry out a linear movement, a drive member adapted to drive the linear shaft member, and a device for measuring a force and a position at the linear actuating mechanism.

In some cases, the moving of the second measurement member may be generated in that the force acting on the linear actuating mechanism deforms the deformation member and the second measurement member, which is connected to the deformation member, is moved by the deformation over a distance which is proportional to the force.

The deformation member may be a resilient member, particularly a spring.

The first coil system may comprise a first coil bobbin and a coil wound around the first coil bobbin, and the first measurement member, which can be made of a metal, can act as a movable coil core in the first coil system. Likewise, the second coil system can comprise a second coil bobbin and a coil wound around the second coil bobbin, wherein the second measurement member, which can be made of a metal, can act as movable coil core in the second coil system.

Herein, the first coil bobbin and the second coil bobbin can be formed integrally. Additionally or alternatively, the first coil bobbin can have a smaller diameter than the second coil bobbin.

The changed electrical characteristics of the first and second coil systems as variable parameter may be used in connection with an electrical circuit, wherein an output signal of the electrical circuit, which is influenced by the variable parameter, can be acquired and can be evaluated for measuring the position and the force at the linear actuating mechanism. The electrical circuit can include at least one electric oscillator circuit, the electrical characteristics being inductivities of the first and second coil system and the output signal being a frequency signal. Additionally or alternatively hereto, the changed electrical characteristics of the first and second coil systems can be used intermittently in order to influence the output signal (PFF), so that a measurement of the force and a measurement of the position can alternately be carried out at predetermined intervals.

The linear actuating mechanism may be a linear drive for actuating a valve for limiting, regulating and/or distributing gases or liquids (e.g. controlled by a thermostat).

In some cases, the use of a non-contact, e.g. inductive, measurement of the operational parameters of the linear actuating mechanism can make it easier to calibrate the linear actuating mechanism when installing it in a system, such as a heating or air-conditioning control system, in accordance with the input desired (limit force for actuation, etc.) and also to readjust the same, if required. In this way, also different environmental influences, such as temperature, can be compensated for better. Accordingly, it is avoided that the linear actuating mechanism or the measurement of operational parameters, such as the push rod position or force applied, is subject to systematic errors. Furthermore, by the non-contact measurement, the susceptibility of the measurement to pollution may be reduced. Besides, the use of an inductive detection for measuring the force can help detect intermediate values, as well, which may help detect when a desired limit force is reached. Furthermore, and in many cases, the system can be produced at low cost, since e.g. no expensive materials or components for the elements of the device may be are required for detecting the force and the position.

BRIEF DESCRIPTION

Figure 2:
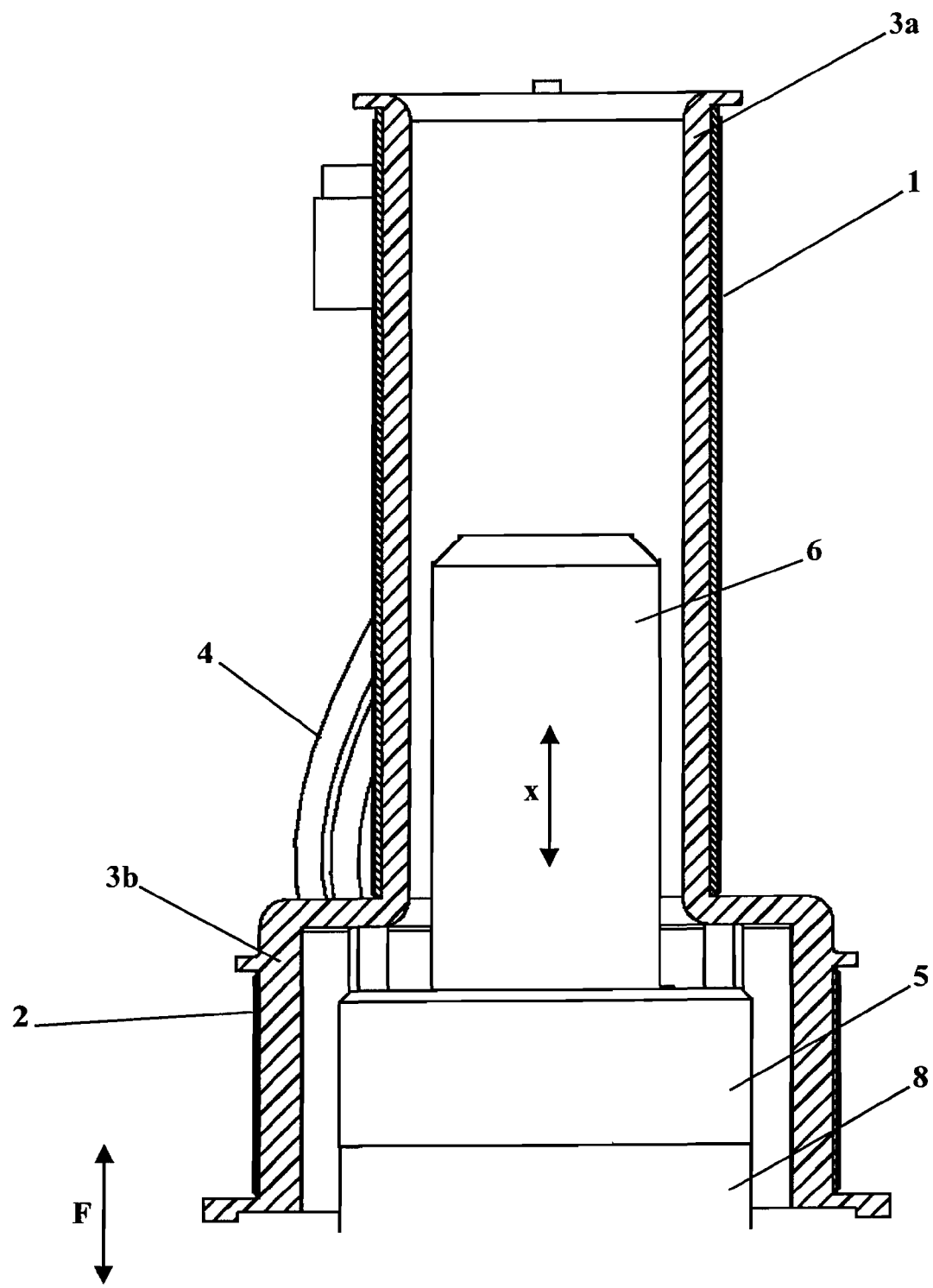
Figure 3:
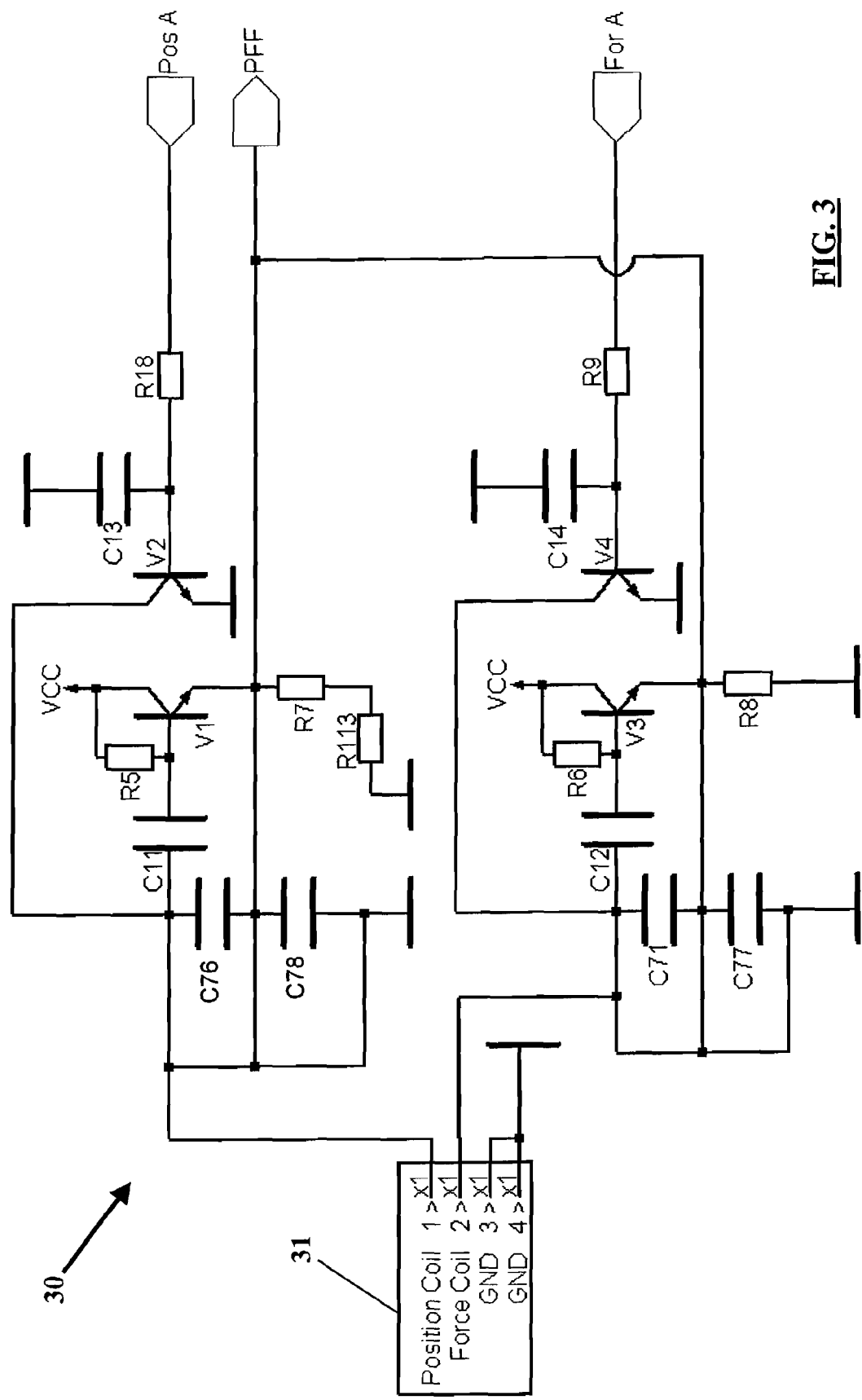

FIG. 1 shows a schematic partial sectional view of a linear actuating mechanism according to an embodiment of the invention, FIG. 2 shows an enlarged view of a part of the linear actuating mechanism shown in FIG. 1, and FIG. 3 shows an electrical circuit diagram of a detecting means used for measuring the force and the position according to the embodiment.

DESCRIPTION

First, the basic principle of an illustrative embodiment of the present invention shall be briefly described.

In one illustrative embodiment, the electrical characteristics of a coil system having e.g. of a coil bobbin and a coil wound thereon change when a metallic object, i.e. a measurement member, is moved in the coil. The electrical characteristics include the inductivity of the coil system and the quality factor of the coil. When the metallic object in the coil system, which may also be designated as coil core, is continuously moved, the electrical characteristics of the coil change accordingly. A use of this principle makes it possible to detect the current position of a shaft member of a linear actuating mechanism, i.e. of a leading screw or a push rod of a linear drive or linear actuator, by the shaft member being used as coil core. A movement of the leading screw or the push rod in the coil system entails a change in the inductivity or the quality factor of the coil, wherein this change can again be detected, thus allowing conclusions as to the movement made or change of position. In other words, a respective measurement signal is produced by a respective position of the measurement member.

A force acting on the linear actuating mechanism (or a force exerted by the linear actuating mechanism) can likewise be detected on the basis of the aforementioned principle by a force-displacement or force-movement conversion. That is to say, when the force acting on the push rod is suitably converted into a movement of a movable member, this movement can be measured as change of position of a metallic measurement member in a coil system by the respective change of the electrical characteristics (e.g. inductivity, coil quality factor) being detected. The force-displacement conversion can e.g. be carried out by means of a resilient deformation member such as a spring, which is deformed upon application of a force, thereby causing the change of position.

In other words, by a static position measurement of a measurement member in a coil system on the basis of a non-contact inductive detection, the position of the linear shaft member of the linear actuating mechanism as well as a force acting thereon can be measured when the components are suitably arranged in a linear actuating mechanism; when this is done, advantageously two separate coil systems may be used for detecting the two operational factors of force and position.

With reference to FIGS. 1 and 2, an example of a linear actuating mechanism shall be described in the following, for which the measurement of force and position may be determined. It has to be noted that the illustrative embodiment may not only be used for a linear actuating mechanism the construction of which corresponds to the linear actuating mechanism shown. Other kinds of linear actuating mechanisms are also suited to use a suitable conversion of force into displacement (or movement)

FIG. 1 shows a schematic partial sectional view of an illustrative linear actuating mechanism, whereas FIG. 2 shows an enlarged view of a section of the linear actuating mechanism according to FIG. 1, in which particularly those components are illustrated for measuring force and position.

Reference sign 20 designates the linear actuating mechanism which is e.g. a linear drive for actuating a valve for limiting, regulating and/or distributing gases or liquids (e.g. controlled by in a thermostat). The linear actuating mechanism 20 comprises a linear shaft member in the form of a leading screw or threaded spindle, a spindle nut 8 enclosing the leading screw 6 at least partially, as well as a drive member 7, such as e.g. a gear wheel which is connected to a motor (which is not shown) and which, when being driven thereby, starts to rotate. The gear wheel 7 is connected to the spindle nut 8, so that upon rotation of the gear wheel 7 driven by the motor the spindle nut 8 is rotated and, thus, the shaft member 6 is moved linearly accordingly (cf. arrow x). Any element to be operated or a mechanical arrangement can be applied to the bottom side of the leading screw 6 in FIG. 1, such as e.g. a valve actuated by the movement of the leading screw 6. In the embodiment described, the leading screw 6 is made of a metal, e.g. of brass.

Reference number 3 designates a cup-shaped attachment which encloses the leading screw 6 and the spindle nut 8 at an end side of the linear actuating mechanism 20. The attachment 3 is e.g. formed of plastics and can be closed at its upper side e.g. by a metal lid (due to the lines of the magnetic field), but it may be left open just as well.

Reference 1 designates a coil winding or coil of a first electric coil system. The coil 1 is wound around a first coil bobbin 3a, which is e.g. part of the attachment 3. The coil winding 1 can be wound up in plural layers and can be formed of a copper wire. Advantageously, the length of coil 1 is at least as long as a possible displacement distance (x) of shaft member 6 in attachment 3 and encloses this displacement distance. As will be described in the following, the coil 1 in the illustrative embodiment is used for detecting the position of shaft member 6.

As has been described above, the leading screw 6 as shaft member of the linear actuating mechanism 20 is linearly moved by means of the spindle nut 8. A second measurement member 5 is connected to the spindle nut 8 and is formed of a metal such as e.g. a copper pipe or the like and is mounted to the upper end of the spindle nut 8 in FIG. 1. The attachment 3 is formed such that it encloses the measurement member 5 at the upper end of the spindle nut 8.

Reference sign 2 designates a second coil winding or coil of a second coil system. The second coil system further comprises a second coil bobbin 3b which is e.g. part of the attachment 3. In other words, the first coil bobbin 3a and the second coil bobbin 3b are integrally formed in the illustrative embodiment. In the illustrative embodiment, the second coil bobbin 3b has a larger diameter than the first coil bobbin 3a. This makes the distance between the inner side of the respective coil bodies 3a and 3b and the outer side of the respective measurement members 6 and 5 small and approximately equal. It has to be noted, however, that the diameters of the first and second coil bodies 3a, 3b may also be equal, which would e.g. be the case if the basic form of attachment 3 was cylindrical. The second coil 2 can, similarly to the first coil 1, be made of copper wire and can be wound up in plural layers. The height of said coil winding 2 is basically equal to a distance which the second measurement member 5 passes through.

Reference 9 designates a resilient deformation member which preferably comprises one or plural springs such as disk springs. The deformation member 9 is connected to the spindle nut 8 and abuts on a solid member 10 at the bottom side in FIG. 1, said solid member being e.g. a thrust ball bearing. The deformation member is adapted to be deformed by a neutral position upwards or downwards by a distance h. In an example in which a limit force for the linear actuator member, e.g. a closing force for a valve to be controlled, amounts to 600 N, the distance h is e.g. +/−2 mm.

Reference sign 4 designates electric lines or wires for connecting the first and second coils 1, 2 to a detection means described in the following.

If the shaft member 6 is moved linearly upwards or downwards by the rotation of the spindle nut 8, the penetration depth of the shaft member 6, which is used as first measurement member, changes in the first coil system, i.e. in the first coil. As has been described above, this serves to change the electrical characteristic (e.g. inductivity, coil quality factor) of the first coil 1. This change is passed on to the detecting means via line 4, so that the position of the shaft member 6 can be detected.

If now a force F is exerted by the linear actuating mechanism 20, e.g. because the leading screw 6 moves the valve (which is not shown) against a resistance, the deformation element 10 is deformed proportionally to the force F. The deformation element 9, which is a resilient deformation member, preferably a spring such as e.g. a disk spring, is deformed by a respective deformation distance h in accordance with force F. The deformation element is connected to the spindle nut 8 and abuts against the solid element 10 which absorbs the force. In other words, the deformation member effects a force-displacement conversion (or force-movement conversion), wherein a force F is converted into a distance h. Hereby, the spindle nut 8 is accordingly displaced in its position by the distance h.

The second measurement member 5, which is attached to the upper end of the spindle nut 8, is consequently accordingly moved in the second coil 2, leading to a change in the electrical characteristics of the second coil 2. This change is passed via lines 4 to the detection means described in the following.

As has been stated above, FIG. 2 shows the two coil systems 1, 3a and 6 as well as 2, 3b and 5 at the upper attachment 3 and the two metallic measurement members 6 and 5 (i.e. the upper ends of the leading screw 6 and the spindle nut 8) in an enlarged manner to facilitate understanding.

FIG. 3 shows an electrical circuit diagram of part of a detection means 30 which is used for evaluating the changes in the electrical characteristics of the first and second coils 1, 2 and, thus, for detecting a force and a position at the linear actuating mechanism. Herein, in the illustrative embodiment, the inductivity of the coils is used as a parameter of the first and second coils 1, 2, but the invention is not limited thereto. Also, the electrical circuit shown in FIG. 3 may be replaced by another circuit, or a respective circuit can be simulated in a computer or the like, as desired.

In FIG. 3, reference sign 31 designates a connecting means with the first and second coils 1, 2, in FIG. 1, wherein the connecting means 31 is e.g. a plug or the like, adapted to be connected to the lines 4 in FIG. 1. Said connection with the first coil 1 is formed via the connector "Position Coil 1", and the connection with the second coil 2 is formed via the connector "Force Coil 2". The connectors GND 3 and GND 4 are ground connections.

According to the illustrative embodiment, the detection means 30 further comprises two oscillators used for the detection of the force and the position, respectively. As example of oscillators, Colpitt oscillators may be used. There, the first coil system for measuring the position is connected to one of the oscillators via the connector "Position Coil 1", and the second coil system for measuring the force is connected to the other oscillator via the connector "Position Coil 2". In other words, the first and the second coil 1, 2 each act as inductivity of the two oscillators, wherein the inductivity of the coils 1, 2 is changed by the measurement members 5, 6, as has been described above.

The first of the two Colpitt oscillators includes capacitors C76, C78, C11, C13, resistors R5, R7, R113, R18, and transistors V1, V2. The wiring of the components is shown in the upper section of FIG. 3. A trigger signal is supplied via an input "Pos A", and serves to apply the first oscillator, which is connected to the coil 1 responsible for the position measurement of the linear actuating mechanism 20, to an output PFF, so that an output signal corresponding to the position is outputted. Furthermore, a supply voltage VCC is applied.

The second of the two Colpitt oscillators includes capacitors C71, C77, C12, C14, resistors R6, R8, R9, and transistors V3, V4. The wiring of the components is shown in the lower section of FIG. 3. Via an input "FOR A", there is supplied a trigger signal which serves to apply the second oscillator, which is connected to the coil 2 responsible for the force measurement of the linear actuating mechanism 20, to the output PFF, so that an output signal corresponding to the force is outputted. Furthermore, a supply voltage VCC is applied.

Alternatively to the above-described structure, also the use of two separate outputs for the upper and the lower oscillator, i.e. for the force measurement and the position measurement, is possible.

The output PFF is connected to a processing means which is not shown, e.g. formed by a microprocessor. As example of such a microprocessor, an 8-bit microprocessor can be used. The processing means evaluates the output signal of the detection means 30 and can forward the respective results to a user. The results can likewise be used in a further control processing or the like. Furthermore, the processing means can be used for outputting the trigger signals applied to the inputs "Pos A" and "For A" in order to control one of the two oscillators, respectively.

The basic mode of operation and the general construction of an oscillator are known to a person skilled in the art and shall not be described in any greater detail here. For measuring the force and the position at the linear actuating mechanism according to the above illustrative embodiment, the upper oscillator converts the change in the inductivity of coil 1, which is generated by the movement of the leading screw 6, into a change in a frequency of a square wave output signal at the output PFF, and the lower oscillator converts the change in the inductivity of coil 2, generated by the movement of the measurement member 5 (caused by the force-displacement conversion by the deformation body 9), into a change in a frequency of a square wave output signal at the output PFF. In other terms, the inductivity of coils 1, 2 is a variable parameter in the oscillator circuits, respectively, so that the change in the inductivities of the coils 1, 2 sets the respective oscillator.

Preferred values for the frequency ranges of the oscillators are, e.g. for the oscillator for the position measurement, within the range of 50 kHz, and, for the oscillator for the force measurement, within the range of 70 kHz. The design of the oscillators for such frequency ranges makes it possible to use a material such as brass for the first measurement member, i.e. the leading screw 6, and a material such as copper for the second measurement member, i.e. the upper end of the spindle nut 8. This material selection simplifies the machining and is less costly than when the use of steel or the like would be required.

The evaluation of the output signal PFF may be effected as described in the following. In some embodiments, only one of the two coils 1, 2 will be evaluated for the measurement, respectively, in order to avoid a mutual influencing of the obtained inductivity values of the respective coils. To this end, the trigger signals "Pos A" and "For A" are supplied intermittently, e.g. at intervals of 100 ms, so that, at the respective intervals, a frequency signal corresponding to the force and a frequency signal corresponding to the position are alternately applied to the output PFF. Since the oscillators can work in a stable manner very quickly, after 5 ms approximately, a reliable measurement is possible.

The frequency signal applied, respectively, is then forwarded via the output PFF to the non-illustrated microprocessor for further processing, e.g. in a feedback control or the like, and/or to the display.

The processing means can be constructed such that it initiates a switch-off of the linear actuating mechanism 20 upon reaching a predetermined limit force, e.g. 600 N. Furthermore, the detection of different force values is possible.

By the above-described non-contact measurement of a force and a position at a linear actuating mechanism with a change in an electrical characteristic of coils being used, it is possible, in a simple, reliable and inexpensive manner, to detect the position of a shaft member of the linear actuating mechanism as well as the force applied thereby and to further process the results obtained accordingly.

The invention claimed is:

1. A method of measuring a force and a position at a linear actuating mechanism, comprising the steps of:
   detecting a change in an electrical characteristic of a first coil system for measuring a position of the linear actuating mechanism, wherein the change in the electrical characteristic is caused by moving of a first measurement member in the first coil system,
   detecting a change in an electrical characteristic of a second coil system for measuring a force acting at the linear actuating mechanism, wherein the change in the electrical characteristic is caused by moving of a second measurement member in the second coil system,
   wherein the first coil system comprises a first coil bobbin and a coil wound around the first coil bobbin, and the first measurement member, which is made of a metal, acts as a movable coil core in the first coil system, and the second coil system comprises a second coil bobbin and a coil wound around the second coil bobbin and the second measurement member, which is made of a metal, acts as movable coil core in the second coil system, the coil of the first coil system being separated from the coil of the second coil system,
   wherein the moving of the first measurement member is generated by a positional change of a linear shaft member of the linear actuating mechanism, and the moving of the second measurement member is generated by a force-displacement conversion via a deformation member.

2. The method according to claim 1, wherein the moving of the second measurement member is generated in that the force acting on the linear actuating mechanism deforms the deformation member and the second measurement member connected to the deformation member is moved by the deformation over a distance which is proportional to the force.

3. The method according to any of claim 1, wherein the deformation member is a resilient member, particularly a spring.

4. The method according to claim 1, wherein the first coil bobbin and the second coil bobbin are formed integrally.

5. The method according to claim 1, wherein the first coil bobbin has a smaller diameter than the second coil bobbin.

6. The method according to claim 1, wherein the diameter of the first coil bobbin is equal to the diameter of the second coil bobbin.

7. The method according to claim 1 further comprising:
   using the changed electrical characteristics of the first and second coil systems as variable parameter in an electrical circuit,
   detecting an output signal of the electrical circuit, which is influenced by the variable parameter, and
   evaluating the output signal for measuring the position and the force at the linear actuating mechanism.

8. The method according to claim 7, wherein the electrical circuit at least comprises an electric oscillator circuit, wherein the electrical characteristics are inductivities of the first and second coil systems and the output signal is a frequency signal.

9. The method according to claim 7, wherein the changed electrical characteristics of the first and second coil systems are used intermittently in order to influence the output signal, so that a measurement of force and a measurement of position are alternately carried out at predetermined intervals.

10. The method according to claim 1, wherein the linear actuating mechanism is a linear drive for actuating a valve for limiting, regulating and/or distributing gases or liquids.

11. The method according to claim 1, wherein the electrical characteristic of the first or second coil system includes at least one of an inductivity of the respective coil system and a quality factor of the respective coil system.

12. A device for measuring a force and a position at a linear actuating mechanism, comprising:
- a linear shaft member,
- a first coil system having a first movable measurement member,
- a second coil system having a second movable measurement member, wherein the first coil system comprises a first coil bobbin and a coil wound around the first coil bobbin, and the first measurement member, which is made of a metal, acts as a movable coil core in the first coil system, and the second coil system comprises a second coil bobbin and a coil wound around the second coil bobbin and the second measurement member, which is made of a metal, acts as movable coil core in the second coil system, the coil of the first coil system being separated from the coil of the second coil system,
- a deformation member connected to the second measurement member, and
- a detection means for detecting a change in an electrical characteristic of the first coil system for measuring a position of the linear actuating mechanism, and in an electrical characteristic of the second coil system for measuring a force acting at the linear actuating mechanism,
- wherein the change in the electrical characteristic of the first coil system is caused by moving of the first measurement member in the first coil system, and the change in the electrical characteristic of the second coil system is caused by moving of the second measurement member in the second coil system,
- wherein the moving of the first measurement member is generated by a positional change of the linear shaft member of the linear actuator device, and the moving of the second measurement member is generated by a force-displacement conversion via the deformation member.

13. The device according to claim 12, wherein the deformation member is adapted to be deformed by the force acting on the linear actuating mechanism, wherein, by the deformation of the deformation member, the second measurement member is moved over a distance which is proportional to the force.

14. The device according to any of claim 12, wherein the deformation member is a resilient member.

15. The device according to claim 12, wherein the first coil bobbin and the second coil bobbin are formed integrally.

16. The device according to claim 12, wherein the first coil bobbin has a smaller diameter than the second coil bobbin.

17. The device according to claim 12, wherein the diameter of the first coil bobbin is equal to the diameter of the second coil bobbin.

18. The device according to any of claim 12, wherein the detection means comprises an electrical circuit using changed electrical characteristics of the first and second coil systems as variable parameter, wherein an output signal of the electrical circuit is influenced by the variable parameter, and
- the detection means is adapted to evaluate the output signal for measuring the position and the force at the linear actuating mechanism.

19. The device according to claim 18, wherein the electrical circuit comprises at least one electrical oscillator circuit, wherein the electrical characteristics are inductivities of the first and second coil systems and the output signal is a frequency signal.

20. The device according to any of claim 18, wherein the detection means is adapted to use the changed electrical characteristics of the first and second coil systems intermittently in order to influence the output signal, so that a measurement of the force and a measurement of the position are carried out alternately at predetermined intervals.

21. The device according to any of claim 12, wherein the linear actuating mechanism is a linear drive for actuating a valve for limiting, regulating and/or distributing gases or liquids.

* * * * *